US007075346B1

United States Patent
Hariman et al.

(10) Patent No.: US 7,075,346 B1
(45) Date of Patent: Jul. 11, 2006

(54) SYNCHRONIZED FREQUENCY MULTIPLIER FOR MULTIPLE PHASE PWM CONTROL SWITCHING REGULATOR WITHOUT USING A PHASE LOCKED LOOP

(75) Inventors: George A. Hariman, Sunnyvale, CA (US); Kenji Tomiyoshi, Cupertino, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 70 days.

(21) Appl. No.: 10/987,107

(22) Filed: Nov. 12, 2004

(51) Int. Cl.
*H03B 19/00* (2006.01)

(52) U.S. Cl. ............... 327/116; 327/91; 327/94; 327/235; 327/295; 327/77; 327/78

(58) Field of Classification Search ...... None
See application file for complete search history.

(56) References Cited

U.S. PATENT DOCUMENTS

| | | | |
|---|---|---|---|
| 3,906,247 A * | 9/1975 | Heffner | 327/263 |
| 5,196,741 A * | 3/1993 | Rustici | 327/91 |
| 5,396,123 A * | 3/1995 | Minamizaki | 327/94 |
| 5,760,623 A * | 6/1998 | Hastings | 327/137 |
| 6,215,290 B1 | 4/2001 | Yang et al. | |
| 6,263,192 B1 | 7/2001 | Alderton | |
| 6,404,175 B1 | 6/2002 | Yang et al. | |
| 6,404,657 B1 | 6/2002 | Mangtani et al. | |
| 6,462,521 B1 | 10/2002 | Yang et al. | |
| 6,583,610 B1 | 6/2003 | Groom et al. | |
| 6,625,045 B1 | 9/2003 | Lethellier | |
| 6,714,426 B1 | 3/2004 | Guo et al. | |
| 6,744,296 B1 | 6/2004 | Chen et al. | |
| 6,967,508 B1 * | 11/2005 | Zhou et al. | 327/122 |

* cited by examiner

*Primary Examiner*—Timothy P. Callahan
*Assistant Examiner*—An T. Luu
(74) *Attorney, Agent, or Firm*—John W. Branch; Darby & Darby PC (57) ABSTRACT

A method and circuit for synchronizing an input clock signal with a plurality of internal clock signals in a multiple phase Pulse Width Modulation (PWM) switching power supply without using a Phase Locked Loop (PLL). A period of the input clock signal is measured by using a frequency to voltage converter. A reference capacitor charged by a constant current source is arranged to generate a reference voltage with a slope based on the period of the input clock signal. A change in the reference voltage across the reference capacitor is substantially inversely proportional to a frequency of the input clock. By providing the reference voltage to a sample-and-hold circuit and using an output of the sample-and-hold circuit to feed a comparator, synchronization may be accomplished. Each internal clock signal is generated by different reference capacitor and current source circuit.

21 Claims, 5 Drawing Sheets

FIG. 5

SYNCHRONIZED FREQUENCY MULTIPLIER FOR MULTIPLE PHASE PWM CONTROL SWITCHING REGULATOR WITHOUT USING A PHASE LOCKED LOOP

FIELD OF THE INVENTION

The present invention relates to power supplies and more specifically to a synchronized frequency multiplier for a multiple phase Pulse Width Modulation (PWM) switching regulator.

BACKGROUND

A PWM switching regulator may be configured to provide a regulated output voltage to satisfy power supply and dynamic requirements of today's microprocessors and related communication systems, in response to an input voltage. For improved efficiency and other considerations, the PWM switching power supply may employ multiple phasing. In a multiple phase switching regulator with PWM control, a plurality of clock signals may be employed, which are 360 deg/M out of phase with each other, where M is the total number of employed phases.

If the switching regulator includes a synchronization capability (i.e. internal clock signals are synchronized with an input clock signal), a Phase Locked Loop (PLL) may be employed. This may result in a synchronized internal clock signal that has a frequency, which is about M-times the frequency input clock signal. This internal clock signal may then be employed using a logic function to extract clock signals for each of the phases of the switching regulator.

Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment or an embodiment combining software and hardware aspects. The following detailed description is, therefore, not to be taken in a limiting sense.

Briefly stated, the present invention is related to a method and circuit for synchronizing an input clock signal with a plurality of internal clock signals in a multiple phase Pulse Width Modulation (PWM) switching power supply without using a Phase Locked Loop (PLL). A frequency to voltage converter is arranged to measure the input clock signal. A reference capacitor charged by a constant current source is arranged to generate a reference voltage with a substantially constant slope. A change in the reference voltage across the reference capacitor may be substantially inversely proportional to a frequency of the input clock. By providing the reference voltage to a sample-and-hold module and using an output of the sample-and-hold module to feed a comparator, synchronization may be accomplished. For each internal clock signal that represents a different phase, a different reference capacitor and current source module may be implemented.

While a preferred embodiment of the present invention may be implemented in a dual phase PWM switching regulator circuit, the invention is not so limited. The described circuit may be employed as part of virtually any multiple-phase PWM switching regulator circuit known to those skilled in the art.

Figure 1:
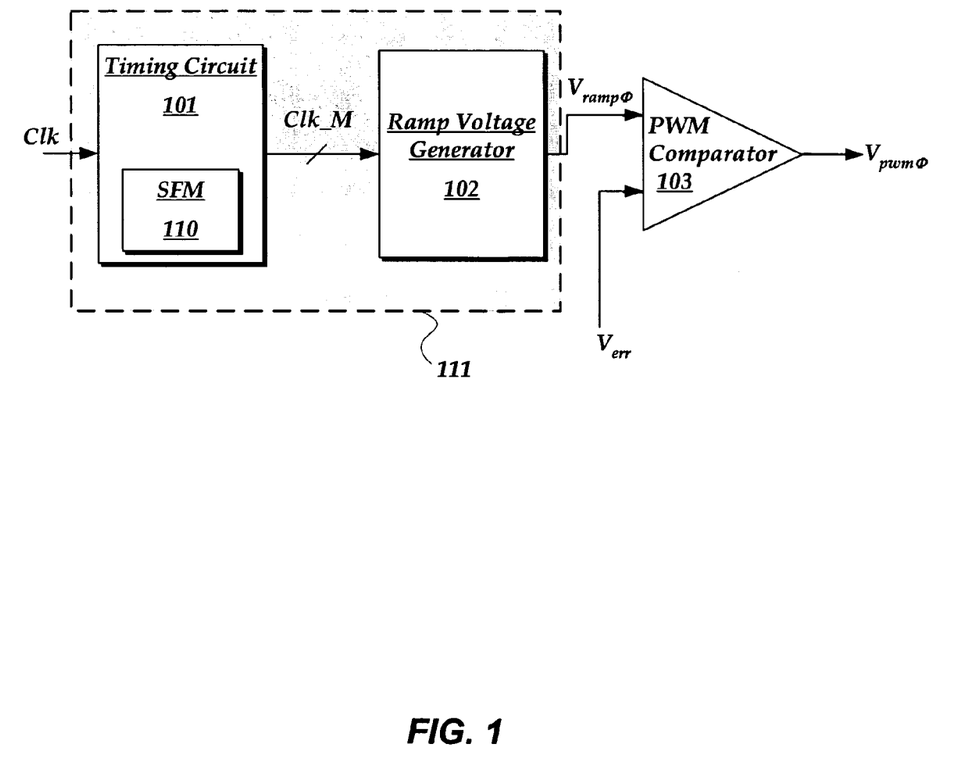
FIG. 1 illustrates a block diagram of an embodiment of a multiple phase PWM circuit in which the present invention may be practiced.

FIG. 1 illustrates a block diagram of an embodiment of multiple phase PWM circuit 100 in which the present invention may be practiced. PWM circuit 100 may be implemented in a high frequency, high power density regulator circuit employing a multiple phase technique.

Increases in an amount of current and demand for faster response time by typical loads for PWM switching regulators, such as microprocessors, and the like, have lead to higher switching frequencies. A higher switching frequency provides faster transient response and smaller converter size (high power density) because of the reduction in the magnetic components size and filter. In a single module, however, the switching frequency could reach such a large and impractical value that switching losses may lead to a reduced overall efficiency and provoke excessive heat.

In response to the foregoing, the multiple phase (interleave) technique provides for connecting multiple PWM switching regulators in parallel with phase shift of their control signals so that the input and output current ripple is naturally canceled while achieving fast response. Inductor currents of the interleaved phases may be added together in a lower ripple input and output current. This results in a switching frequency for each module that is lower than an output voltage ripple frequency. Accordingly, a higher output voltage ripple frequency can be achieved as the number of interleaved phases increases.

Moreover, an effective output inductance is reduced because of the parallel configuration and the transient response is improved. By increasing the number of paralleled phases, higher current capability may be achieved. Thermal problems may also be easier to handle in a multiple phase converter.

PWM circuit 100 includes PWM control circuit 111 and PWM comparator 103. PWM control circuit 111 includes timing circuit 101, which includes synchronized frequency multiplier circuit 110, and ramp voltage generator 102. Timing circuit 101 is arranged to receive input clock signal Clk and provide, in response, a plurality of phase-shifted internal clock signals Clk_M, where N is an integer between one and M, a total number of clock signals. A total number of internal clock signals may be predetermined by synchronized frequency multiplier circuit 110. In one embodiment, Timing circuit 101 may provide additional timing signals to other circuitry either generated internally by timing circuit 101 or based on input clock signal Clk.

Synchronized frequency multiplier circuit 110 is arranged to generate the plurality of phase-shifted internal clock signals Clk_M and synchronize them with input clock signal Clk. As described in more detail below, each phase-shifted internal clock signal may be generated by a separate reference capacitor and a current source module. A number of the reference capacitors and the current source modules in synchronized frequency multiplier circuit 110 may depend on the number of employed internal clock signals.

Ramp voltage generator 102 is arranged to receive the plurality of phase-shifted internal clock signals Clk_M and to provide, in response to the clock signals, ramp voltage $V_{ramp\Phi}$ to PWM comparator 103.

PWM comparator circuit 103 is arranged to receive $V_{ramp\Phi}$ and error voltage $V_{err}$ from an error amplifier and to provide multi-phase pulse width modulating voltage $V_{pwm\Phi}$. In one embodiment, $V_{pwm\Phi}$ may be provided to an input of a driver circuit, which comprises parallel arranged driver elements each controlling a voltage converting element or a current converting element of a regulator device.

Figure 2:
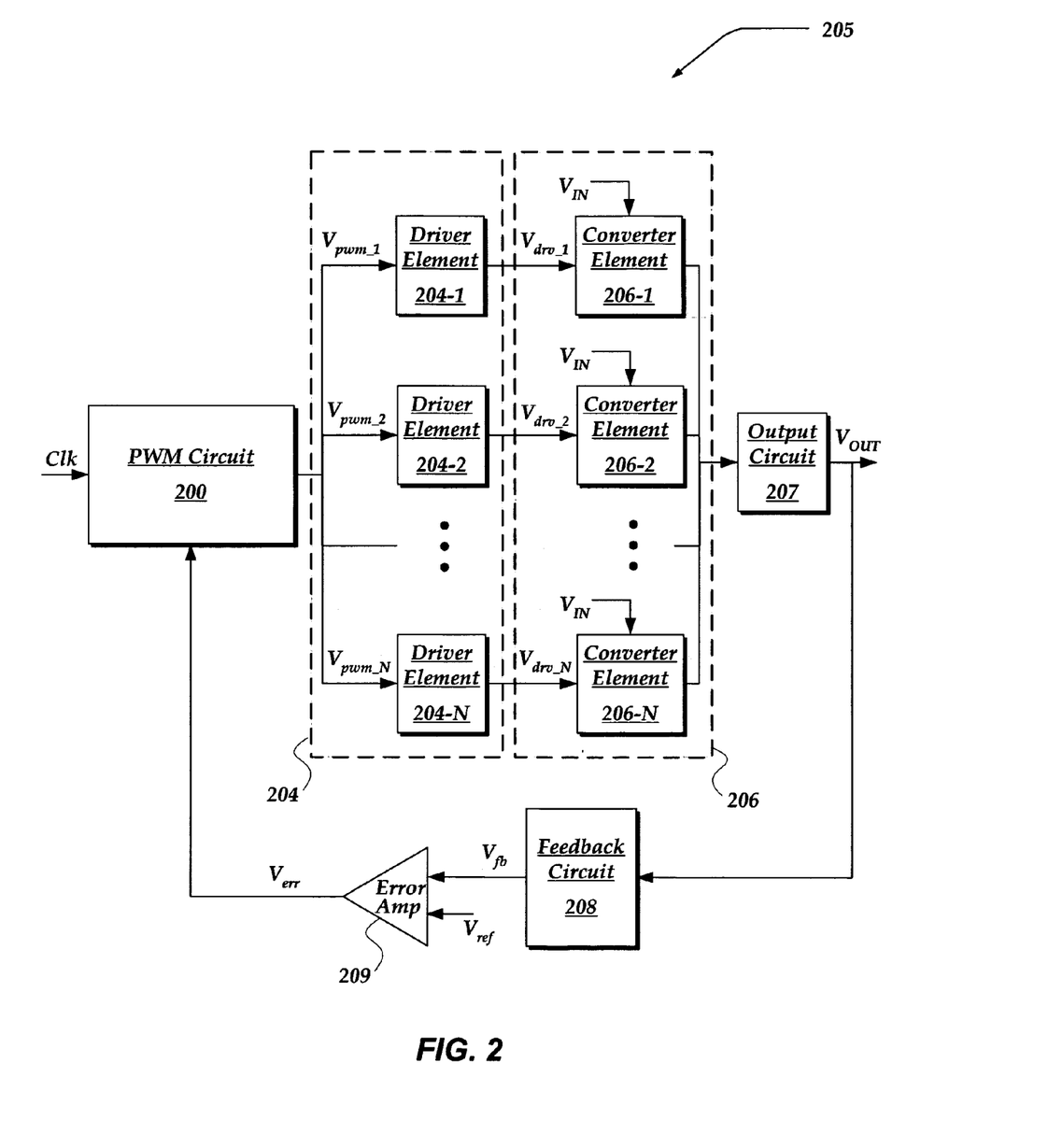
FIG. 2 illustrates a block diagram of an embodiment of a multiple phase PWM regulator circuit which includes the PWM circuit of FIG. 1.

FIG. 2 illustrates a block diagram of an embodiment of multiple phase PWM regulator circuit 205 which includes PWM circuit 100 of FIG. 1. PWM regulator circuit 205 further includes driver circuit 204, converter circuit 206, feedback circuit 208, and error amplifier 209.

As described above, PWM circuit 200 is arranged to receive input clock signal Clk and provide, in response, multi-phase pulse width modulating voltage $V_{pwm\Phi}$ that is in part based on a plurality of phase-shifted internal clock signals Clk_M. The multiple clock signals enable a multi-phase operation of PWM regulator circuit 205 with a total number of phases based on the total number of internal clock signals.

Driver circuit 204 includes parallel coupled driver elements 204-1 through 204-N, which are arranged to receive individual phase shifted components of $V_{pwm\Phi}$ ($V_{pwm\_1}$ through $V_{pwm\_N}$) and to provide drive voltages $V_{drv\_1}$ through $V_{drv\_N}$, respectively, to converter circuit 206. Depending on a type of converter circuit 206, driver circuit 204 may include appropriate components to control converter elements 206-1 through 206-N of converter circuit 206.

Converter circuit 206 is arranged to receive input voltage $V_{IN}$ and provide phase-shifted regulated voltages to output circuit 207 in response to $V_{IN}$ and $V_{drv\_1}$ through $V_{drv\_M}$. Converter circuit 206 includes converter elements 206-1 through 206-N, each of which is arranged to receive a drive voltage such as $V_{drv\_N}$ and $V_{IN}$, and to provide a regulated voltage. Because each converter element is driven by a phase-shifted drive voltage, regulated outputs of converter elements 206-1 through 206-M are phase-shifted by substantially the same amount as $V_{drv\_1}$ through $V_{drv\_N}$. In one embodiment, converter circuit 206 may be implemented as a switching converter. Accordingly, converter elements 206-1 through 206-N may comprise MOSFET switch transistors, each driven by a driver element. Such an embodiment of PWM regulator 205 is a PWM switching regulator power supply.

In another embodiment, converter circuit 206 may include a linear power pass circuit making PWM regulator 205 a PWM linear regulator circuit. Furthermore, Converter circuit 206 may be configured to regulate at least one of a voltage and a current.

In one implementation of the PWM switching regulator power supply, converter circuit 206 may include two virtually identical step-down-switch-mode power supply (SMPW) circuits. In another implementation, where more than two phases may be employed for multiplexing, more than two converter circuits may be implemented.

Feedback circuit 208 is arranged to receive $V_{OUT}$ and provide feedback voltage $V_{fb}$ based on $V_{OUT}$. In one embodiment, feedback circuit 208 may include a resistor circuit, a voltage divider circuit, and the like. Error amplifier 209 is arranged to receive feedback voltage $V_{fb}$ and provide an error voltage $V_{err}$, which is based on $V_{fb}$, to PWM circuit 200. $V_{err}$ may be provided to an input of a PWM comparator within PWM circuit 200 to be compared with $V_{ramp\Phi}$.

Output circuit 207 is arranged to receive multiple phase voltage from converting elements and provide combined output voltage $V_{OUT}$. Output circuit 207 may include an output inductor, an RC filter circuit, and an output capacitor, and the like.

FIG. 2 shows a particular arrangement of inputs and outputs of the various components. In one embodiment, all of the components of multiple phase PWM regulator circuit 205 may be included in the same chip. Alternatively, one or more of the components may be off-chip.

Figure 3:
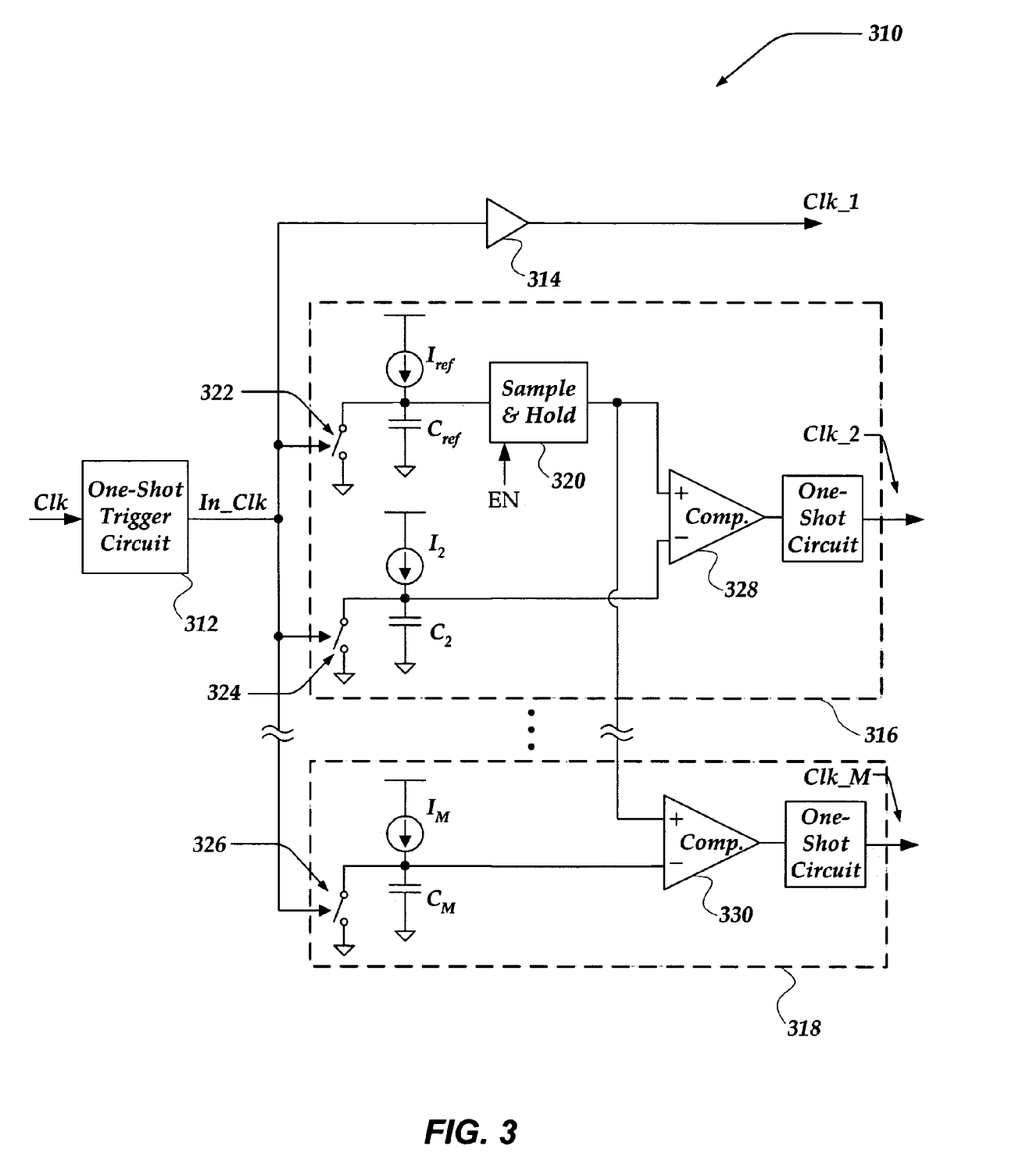
FIG. 3 illustrates a schematic block diagram of one embodiment of a synchronized frequency multiplier circuit for the multiple phase PWM circuit of FIG. 1.

FIG. 3 illustrates a schematic block diagram of one embodiment of synchronized frequency multiplier circuit 310. Synchronized frequency multiplier circuit 310 may be implemented as part of multiple phase PWM circuit 100 of FIG. 1. Synchronized frequency multiplier circuit 310 includes one-shot trigger circuit 312, internal clock generation circuits 316 and 318, and buffer 314. Internal clock generation circuit 316 includes switches 322 and 324, current sources $I_{ref}$ and $I_2$, capacitors $C_{ref}$ and $C_2$, sample-and-hold module 320, and comparator 328. Internal clock generation circuit 318 includes switch 326, current source $I_M$, capacitor $C_M$, and comparator 330.

When synchronized frequency multiplier 310 is in operation, one-shot trigger circuit 312 is arranged to provide a pulse based on input clock signal Clk. First internal clock signal Clk_1 is provided by passing an output of one-shot trigger circuit 312, In_Clk, through buffer 314. Accordingly, Clk_1 is synchronized with Clk and has about the same phase.

In operation, reference capacitor $C_{ref}$ is arranged to be charged by a current from reference current source $I_{ref}$. Switch 322 is arranged to be closed upon being triggered by In_Clk from one-shot trigger circuit 312 and thereby discharge $C_{ref}$. $V_{ref}$ is a voltage across $C_{ref}$ that is provided to sample-and-hold module 320. Sample-and-hold module 320 is arranged to sample $V_{ref}$ in response to a timing signal based on Clk, and hold a peak value of $V_{ref}$. Sample-and-hold module 320 then provides the peak value of $V_{ref}$ to an input of comparator 328.

Another input of comparator 328 is provided with $V(C_2)$, which is across second capacitor $C_2$. $C_2$ may have substantially same capacitance as $C_{ref}$ and be charged by constant current source $I_2$. Constant current source $I_2$ may be arranged to provide a current that has a magnitude two times a magnitude of the current provided by $I_{ref}$. This may result in a slope of $V(C_2)$ being twice a slope of $V_{ref}$. Similar to the other input of comparator 328, switch 324 is arranged to close based on In_Clk and discharge $C_2$.

Comparator 328 may provide a high output every time $V(C_2)$ exceeds the peak of $V_{ref}$. Accordingly, Clk_2 may include a pulse with a delay of ½ times a period of Clk (i.e. 180 degree phase shift). A pulse width of Clk_2 is determined by a one-shot circuitry.

The above described mechanism provides a dual phase internal clock, and may be generalized for a multiple phase circuit by adding as many internal clock generation circuits, such as internal clock generation circuit 318, as needed. In internal clock generation circuit 318, representing additional internal clock generation circuits, switch 326 is controlled by one-shot clock signal In_Clk. Capacitor $C_M$ has about the same capacitance as $C_{ref}$ and current source $I_M$ is arranged to provide a current that has a magnitude $$\frac{M}{M-N+1}$$

times the magnitude of the current provided by $I_{ref}$, where M represents a total number of internal clock generation circuits, and N is an integer representing the circuit number with a value between one and M. For example, in a triple phase circuit the currents may be $$I_1 = \frac{3}{3} * I_{ref} = 1 * I_{ref}; I_2 = \frac{3}{2} * I_{ref} = 1.5 * I_{ref};$$

and $$I_3 = \frac{3}{1} * I_{ref} = 3 * I_{ref}.$$

This results in a slope of voltage V(CM) across capacitor CM being $$\frac{M}{M-M+1}$$

times the slope of $V_{ref}$. Comparator 330 may provide a high value for Clk_M whenever $V(C_M)$ exceeds $V_{ref}$. Accordingly, Clk_M has a phase shift of $$\frac{M-1}{M} * 360$$

degrees.

Figure 4:
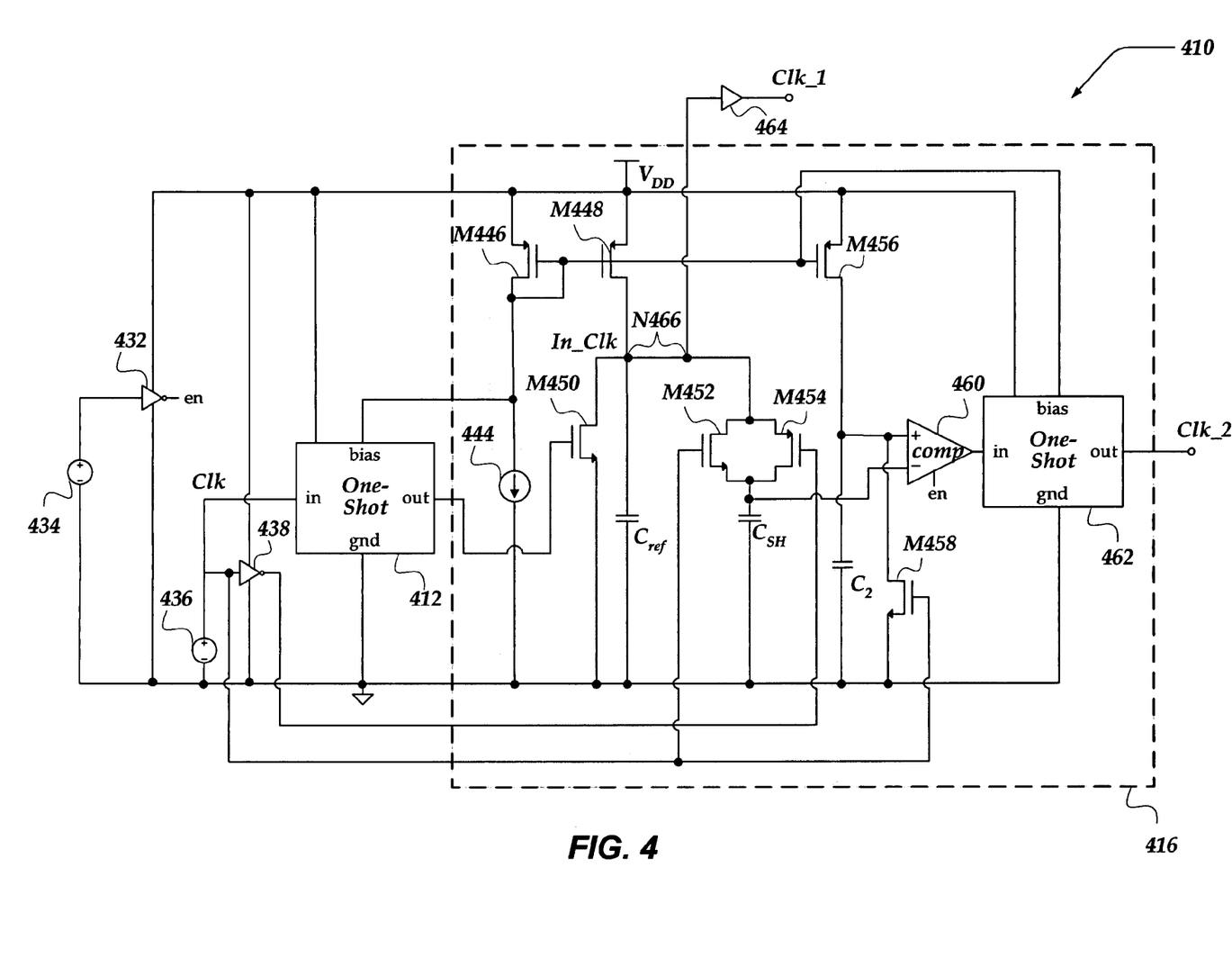
FIG. 4 schematically illustrates a dual phase embodiment of the synchronized frequency multiplier circuit of FIG. 3.

FIG. 4 schematically illustrates one embodiment of dual phase synchronized frequency multiplier circuit 410. Synchronized frequency multiplier circuit 410 may be an N=2 implementation of internal clock generation circuit 316 of FIG. 3. Synchronized frequency multiplier circuit 410 includes inverters 432 and 438, one-shot circuits 412 and 462, current source 444, comparator 460, transistors M446, M448, M450, M452, M454, M456, and M458. Synchronized frequency multiplier circuit 410 further includes capacitors $C_{ref}$, $C_{SH}$, and $C_2$. Voltage source 436 represents a source for input clock signal Clk. Voltage source 434 represents a shutdown signal.

Transistors M452 and M454, and capacitor $C_{SH}$ are arranged to operate as a sample-and-hold module that samples and provides reference voltage $V_{ref}$ across $C_{ref}$ to an inverting input of comparator 460. Comparator 460 is arranged to operate together with one-shot circuit 462. When one input of comparator 460 exceeds another input, comparator 460 provides a voltage to an input of one-shot circuit 462, which in turn transmits a pulse. For example, in case of the dual phase synchronized frequency multiplier circuit, comparator 460 is arranged to receive a peak value of $V_{ref}$ and $V(C_2)$ at its inputs. Whenever $V(C_2)$ exceeds the peak value of $V_{ref}$, one-shot circuit generates a pulse (Clk_2) as explained in conjunction with FIG. 3 above.

One-shot circuit 412 is arranged to operate as a one-shot trigger circuit such as one-shot trigger circuit 312 of FIG. 3. In operation Clk may be a relatively wide pulse. One-shot circuit 412 is arranged to provide a relatively short pulse that is synchronous to a rising edge of Clk. Current source 444, and transistors M446 and M448 are arranged to operate as a reference current source, and to charge reference capacitor $C_{ref}$ with a constant current. Current source 444, and transistor M446 together with transistor M456 are arranged to operate as a second constant current source, and to charge second capacitor $C_2$ with a constant current.

In one embodiment, a ratio of junction areas of M456 to M448 may be pre-selected such that the constant current provided to $C_2$ is about twice the current provided to $C_{ref}$. This may result, as described above, in a slope of $V(C_2)$ having a slope that is twice a slope of $V_{ref}$. The difference in voltage slopes may result in activation of one-shot circuit 462 whenever $V(C_2)$ exceeds the peak value $V_{ref}$, which is sampled and held by a sample-and-hold module comprising transistors M452, 454 and capacitor $C_{SH}$. Sample transistors M452 and M454 are arranged to be activated by Clk and deactivated by inverted Clk. This enables the sample-and-hold module to sample $V_{ref}$ during its peak and forward that peak to the inverting input of comparator 460. Transistors M450 and M458 are arranged to operate as switches that enable $C_{ref}$ and $C_2$ to be discharged based on In_Clk, respectively.

Buffer circuit 464 is arranged to receive the signal at node N466 and provide first internal clock signal Clk_1, which is synchronized with Clk, and has about the same phase.

While internal clock generation circuit 416 is shown employing MOSFET transistors and references to MOSFET technology are made throughout the specification and claims, other technologies such as BiCMOS, HBT, MESFET and BJT may also be implemented without departing from the scope or spirit of the invention. Moreover, the invention is not limited to the exemplary circuit described above. Other implementations of the present invention may be made without departing from the scope and spirit. For example, a four phase PWM regulator may include four internal clock generation circuits.

Figure 5:
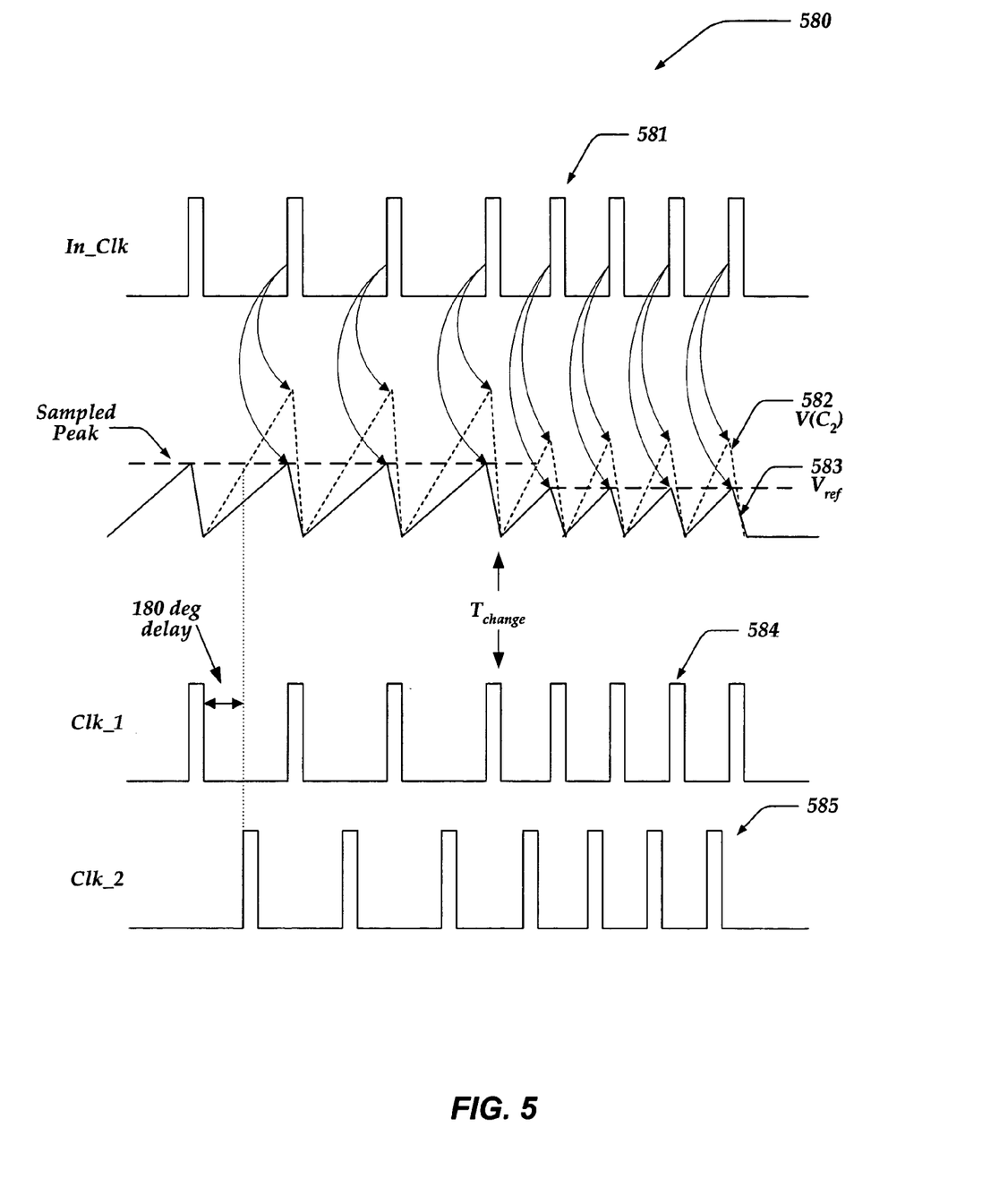
FIG. 5 illustrates a timing diagram of various waveforms involved in an operation of a synchronized frequency multiplier circuit such as the synchronized frequency multiplier circuit of FIG. 4.

FIG. 5 illustrates timing diagram 580 of various waveforms involved in an operation of a synchronized frequency multiplier circuit such as the dual phase synchronized frequency multiplier circuit (416) of FIG. 4.

Timing diagram 580 includes one-shot clock signal In_Clk (581), which is based on input clock signal Clk, second capacitor voltage V(C$_2$) (582), reference capacitor voltage V$_{ref}$ (583), first internal clock signal Clk_1 (584), and second internal clock signal Clk_2 (585).

As waveform 581 shows, input clock signal In_Clk changes its frequency after four pulses. When the circuit is operating, reference capacitor C$_{ref}$ generates a sawtooth-shaped reference voltage V$_{ref}$, which has about the same period as the input clock signal and reaches its peak at sampled peak value. As described in FIG. 3, C$_2$ is arranged to have about the same capacitance as C$_{ref}$. Because a current charging C$_2$ has about twice the magnitude of a current charging C$_{ref}$, V(C$_2$) (582) may have a slope that is twice a slope of V$_{ref}$, and therefore a peak value that is about twice a peak value of reference voltage V$_{ref}$, while having about the same frequency.

First internal clock signal Clk_1 is synchronized with In_Clk having about the same phase. In a dual phase circuit such as synchronized multiplier circuit 416 of FIG. 3, second internal clock signal Clk_2 is generated whenever V(C$_2$) exceeds the sampled peak value of V$_{ref}$. Because V(C$_2$) has about twice the slope of V$_{ref}$, it is bound to exceed the sample peak value at about half period of In_Clk resulting in 180 degrees phase shift of Clk_2 from Clk_1, as waveforms 584 and 585 shows.

When the frequency of In_Clk changes, a peak and a frequency of V$_{ref}$ and V(C$_2$) change as well. As determined by V$_{ref}$ and V(C$_2$), Clk_1 and Clk_2 change their frequency to about the same value as In_Clk maintaining their 180 degree phase difference.

The above specification, examples and data provide a description of the manufacture and use of the composition of the invention. Since many embodiments of the invention can be made without departing from the spirit and scope of the invention, the invention also resides in the claims hereinafter appended.

We claim:

1. A synchronized frequency multiplier circuit, comprising:
   a plurality of M internal clock generation circuits, including:
      a first internal clock generation circuit is arranged to provide a first internal clock signal that is synchronized with an input clock signal; and
      a second internal clock generation circuit that is arranged to:
         provide a second voltage that increases about M times faster than a reference voltage; and
         provide a second internal clock signal that is phase-shifted by about $$\frac{360}{M}$$

degrees from the first internal clock signal based on a comparison of the second voltage with the reference voltage.

2. The circuit of claim 1, wherein M is an integer greater than two, so that the plurality of M internal clock generation circuits further includes:
   up to (M−2) additional internal clock generation circuits that are arranged such that an Nth internal clock generation circuit of the up to (M−2) additional internal clock generation circuits is configured to provide an Nth internal clock signal, wherein N is an integer between three and M, inclusive, and wherein the Nth internal clock generation circuit is arranged such that:
      the Nth internal clock signal is based on a comparison of the peak value of the reference voltage and an Nth voltage, wherein the Nth voltage is arranged to increase about $$\frac{M}{M-N+1}$$

times faster then the reference voltage; and
      the Nth internal clock signal is phase-shifted by $$(N-1)*\frac{360}{M}$$

degrees from the first internal clock signal.

3. The circuit of claim 2, wherein the Nth internal clock generation circuit comprises:
   a reference current source that is arranged to provide a constant reference current;
   a reference capacitor that is arranged to be charged by the constant reference current;
   a first switch circuit that is arranged to close based on a one-shot clock signal such that the reference capacitor is discharged based on the one-shot clock signal and such that the reference capacitor provides a reference voltage;
   a sample-and-hold module that is arranged to provide a signal that corresponds to a peak value of the reference voltage based on the input clock signal;
   an Nth current source that is arranged to provide a constant Nth current such that a magnitude of the Nth current is about $$\frac{M}{M-N+1}$$

times a magnitude of the reference current, wherein N is an integer between three and M, inclusive;
   an Nth capacitor that has about the same capacitance as the reference capacitor, and is arranged to be charged by the Nth current
   a second switch circuit that is arranged to close based on the one-shot clock signal such that the Nth capacitor is discharged based on the one-shot clock signal and the Nth voltage is provided based on the Nth current; and
   a comparator circuit that is arranged to provide the Nth internal clock signal based on a comparison of the peak value of the reference voltage and the Nth voltage.

4. The circuit of claim 3, wherein the comparator and one-shot circuit is arranged to receive a peak value of the reference voltage and the Nth voltage, and to trigger the one-shot circuit if a value of the Nth voltage exceeds the peak value of the reference voltage.

5. The circuit of claim 1, further comprising a one-shot trigger circuit that is arranged to provide a one-shot clock signal based on the input clock signal.

6. The circuit of claim 5, wherein the first internal clock generation circuit comprises a buffer circuit, and a one-shot trigger circuit.

7. The circuit of claim 1, wherein the synchronized frequency multiplier circuit includes two internal clock generation circuits arranged such that the second internal clock generation circuit provides a 180 degrees phase-shifted internal clock signal from the first clock signal.

8. The circuit of claim 1, wherein the synchronized frequency multiplier circuit is incorporated into at least one of a switching Pulse Width Modulation (PWM) power supply circuit and a linear PWM power supply circuit for generating a plurality of timing signals for the PWM power supply circuit.

9. A method of generating a plurality of synchronized and phase-shifted internal clock signals based on an input clock signal, the method comprising:
   providing a first internal clock signal that is synchronized with the input clock signal; and
   providing at least one, up to (M−1), additional internal clock signals such that an Nth internal clock signal of the at least one, up to (M−1), additional internal clock signals are synchronized with the input clock signal and phase-shifted by about $$(N-1)*\frac{360}{M}$$

degrees from the first internal clock signal, wherein N is an integer between two and M, and wherein providing the Nth internal clock signal comprises:
   determining a peak value of a reference voltage;
   determining an Nth voltage; and
   comparing the peak value of the reference voltage and the Nth voltage, wherein the Nth voltage is arranged to increase about $$\frac{M}{M-N+1}$$

times faster then the reference voltage.

10. The method of claim 9, wherein determining the peak value of the reference voltage comprises:
   charging a reference capacitor with a constant reference current;
   discharging the reference capacitor based on the input clock signal;
   sampling the reference voltage based on the input clock signal such that a peak value of the reference voltage is captured;
   holding the peak value of the reference voltage and providing the peak value of the reference voltage to a comparator.

11. The method of claim 9, wherein determining the Nth voltage comprises:
   charging an Nth capacitor with a constant Nth current, wherein the Nth current has a magnitude that is about $$\frac{M}{M-N+1}$$

times a magnitude of a constant reference current;
   discharging the Nth capacitor based on the input clock signal; and
   providing the Nth voltage across the Nth capacitor to the comparator.

12. The method of claim 10, wherein discharging the reference capacitor based on the input clock signal includes:
   determining a one-shot clock signal based on the input clock signal; and
   discharging the reference capacitor by closing a switch based on the one-shot clock signal.

13. The method of claim 11, wherein discharging the Nth capacitor based on the input clock signal includes:
   determining a one-shot clock signal based on the input clock signal; and
   discharging the Nth capacitor by closing another switch based on the one-shot clock signal.

14. The method of claim 13, wherein determining the one-shot clock signal based on the input clock signal comprises:
   triggering a one-shot circuit based on the input clock signal.

15. The method of claim 9, wherein comparing the peak value of the reference voltage and the Nth voltage comprises:
   triggering another one-shot circuit if a value of the Nth voltage exceeds the peak value of the reference voltage.

16. The method of claim 9, further comprising:
   employing the plurality of synchronized and phase-shifted internal clock signals to provide a plurality of timing signals to a PWM switching power supply circuit.

17. A synchronized frequency multiplier circuit, comprising:
   a one-shot trigger circuit that is arranged to provide a one-shot clock signal based on an input clock signal;
   a first internal clock generation circuit that is arranged to provide a first internal clock signal that is synchronized with the input clock signal; and
   a second internal clock generation circuit that is arranged to provide a phase-shifted second internal clock signal based on a comparison of a peak value of a reference voltage and a second voltage such that:
      the reference voltage and the second voltage are generated based on the one-shot clock signal;
      the second voltage is arranged to increase two times faster than the reference voltage; and
      the second internal clock signal is about 180 degrees phase-shifted from the first internal clock signal.

18. A multiple-phase PWM regulator device including a synchronized frequency multiplier circuit, the device comprising:
   a PWM circuit that is arranged to provide a PWM voltage based on a comparison of an error voltage with a ramp voltage, wherein the PWM circuit is arranged to determine the ramp voltage based on a plurality of synchronized and phase-shifted internal clock signals provided by the synchronized frequency multiplier circuit, and wherein the synchronized frequency multiplier circuit comprises:
      a first internal clock generation circuit that is arranged to provide a first internal clock signal that is synchronized with an input clock signal; and
      at least one, up to (M−1), additional internal clock generation circuits that are arranged such that an Nth internal clock generation circuit of the at least one, up to (M−1), additional internal clock generation circuits is configured to provide an Nth internal clock signal such that:
         the Nth internal clock signal is based on a comparison of a peak value of the reference voltage and an Nth voltage, wherein the Nth voltage is arranged to increase about $$\frac{M}{M-N+1}$$

times faster then the reference voltage, and wherein N is an integer between two and M, inclusive; and the Nth internal clock signal is phase-shifted by $$(N-1) * \frac{360}{M}$$

degrees from the first internal clock signal;

a driver circuit that is arranged to receive the PWM voltage and control at least one converting element based on the PWM voltage; and a converter circuit, which is arranged to provide a regulated output voltage based on an input voltage, comprising the at least one converting element.

19. The device of claim 18, wherein the Nth internal clock generation circuit includes a comparison circuit, comprising:
   an one-shot circuit; and
   a comparator, wherein the comparator is arranged to receive a sampled voltage corresponding to the peak value of the reference voltage and the Nth voltage, and to trigger the one-shot circuit if a value of the Nth clock voltage exceeds a value of the sampled voltage.

20. The device of claim 18, wherein the converter circuit comprises at least one of a switching converter and a linear converter.

21. The circuit of claim 20, wherein the converter circuit is arranged to regulate at least one of a voltage and a current.

* * * * *

UNITED STATES PATENT AND TRADEMARK OFFICE
CERTIFICATE OF CORRECTION

PATENT NO.         : 7,075,346 B1
APPLICATION NO.    : 10/987107
DATED              : July 11, 2006
INVENTOR(S)        : George A. Hariman et al.

It is certified that error appears in the above-identified patent and that said Letters Patent is hereby corrected as shown below:

On The Title Page: Col. 2 (U.S. Patent Documents), Line 4, After "6,583,610" delete "B1" and insert -- B2 --.

Column 5, Line 32, After "may be" insert -- : --.

Column 5, Line 45, Delete "V(CM)" and insert -- $V(C_M)$ --.

Column 5, Line 46, Delete "CM" and insert -- $C_M$ --.

Signed and Sealed this

Twelfth Day of December, 2006

JON W. DUDAS
*Director of the United States Patent and Trademark Office*